Jan. 23, 1962 R. T. INNIS 3,018,406
LIGHTNING ARRESTER
Filed July 17, 1958
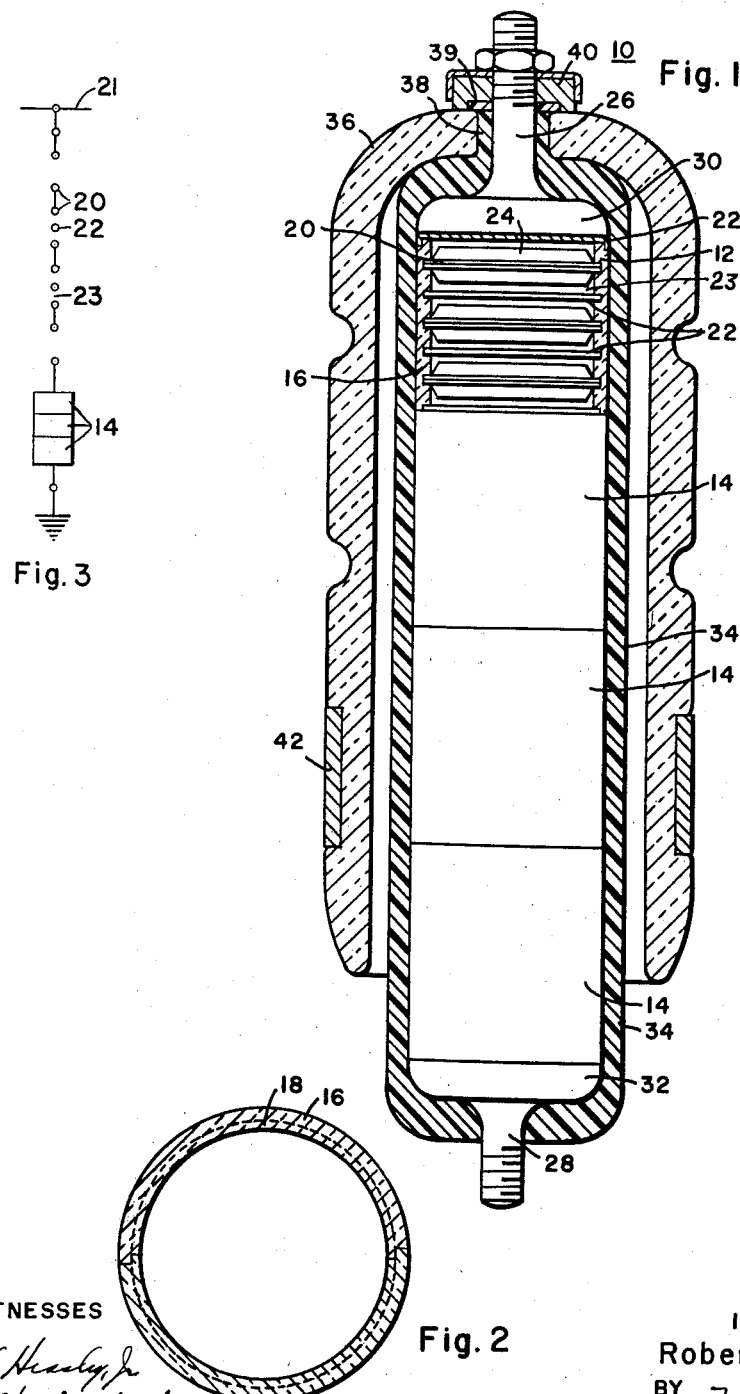
INVENTOR
Robert T. Innis
BY
ATTORNEY

United States Patent Office 3,018,406
Patented Jan. 23, 1962

3,018,406
LIGHTNING ARRESTER
Robert T. Innis, Richland Township, Monroe County, Ind., assignor to Westinghouse Electric Corporation, East Pittsburgh, Pa., a corporation of Pennsylvania
Filed July 17, 1958, Ser. No. 749,290
3 Claims. (Cl. 315—36)

The present invention relates to improved spark-gap devices, and more particularly to an improved housing for a valve-type lightning arrester.

Valve-type lightning arresters usually comprise a vertical stack of plate-like gap electrodes of circular configuration and non-linear resistances connected in series. This stack is customarily enclosed by a porcelain housing. Various techniques are used to seal the top and bottom of the housing while permitting exposure of the terminals for connection. Separate means are provided for properly spacing the electrodes.

Use of porcelain material for housing the arrester elements constitutes a major design limitation because of its brittleness and large manufacturing tolerances. Ground, polished ends are frequently required to obtain sealing surfaces so necessary in valve type arresters since ineffective sealing may cause moisture leakage. To prevent breakage during manufacture and shipping, heavy wall sections are also required. All of these conditions result in increasing the cost of manufacture. Because of the heavy porcelain sections and hermetically sealed fittings, if failure of the arrester occurs internally, gas pressure is generated rapidly. High pressures may be reached and heavy wall sections are required to prevent fracture of the housing. If fracture does occur it is possible that large fragments of the housing may be hurled about with great force resulting in a dangerous situation.

Some of these objections to porcelain housings have been overcome by providing a molded synthetic resin housing which is moisture proof and not so brittle as porcelain. However, with the introduction of molded plastic housings, new problems have been introduced. With molded plastic housings it is difficult to accurately space the electrodes. Close tolerances are difficult to maintain in a housing which is injection molded around the gap elements and resistance blocks. Injection molding is the most practicable means for manufacturing these housings. Another problem raised by the injection molding process is the leakage of plastic material into the gap during the molding operation when utilizing known constructions. It is difficult and expensive to overcome these problems during manufacture. The plastic molded housing of this invention which utilizes separately molded shells to space and house the gap electrodes obviates the above mentioned difficulties and problems.

It is therefore the principal object of this invention to provide an improved moisture-proof housing for a spark-gap device utilizing a plastic molded housing.

Another object if this invention is to provide an improved moisture-proof housing for a lightning arrester utilizing separately molded spacing elements for the gap structure and a plastic molded housing.

A further object of this invention is to provide an improved moisture-proof housing for a lightning arrester utilizing a pair of separately molded interlocking half shells for enclosing the gap and a plastic molded housing for enclosing and sealing the shells, gaps and non-linear resistance or valve blocks.

The invention will be more fully understood from the following detailed description taken in connection with the accompanying drawings, in which:

FIGURE 1 is a longitudinal sectional view showing an illustrative embodiment of an invention;

FIG. 2 is a transverse sectional view showing the molded interlocking half shells of the invention; and FIG. 3 is a schematic view showing the equivalent circuit of the arrester.

FIG. 1 of the drawing shows a lightning arrester generally indicated at 10 embodying the invention which is suitable for distribution type valve arresters. The arrester 10 comprises a spark-gap structure 12 and a plurality of non-linear resistance elements 14 connected in series with the spark-gap structure 12 and with each other. The spark-gap structure 12 includes a pair of semi-cylindrical half shells 16 which can best be seen in FIG. 2. Each of the half shells subtend an angle of 180° so that when the longitudinal edges of the shells are placed adjacent to one another in opposing relationship, a hollow cylindrical tube is formed. The longitudinal edges of the half shells are shaped so that when the two half shells are placed with their longitudinal edges in opposing relationship, an interlocking rabbet joint is made. The half shells are preferably of molded arc resistant material.

Formed in the inner surface of the shells are circumferential grooves 18. When the half shells are placed together to form a cylinder, the circumferential grooves 18 of each half shell are in alignment to form continuous annular slots. Into these slots are placed electrodes 20 and 22 spaced to form gaps 23 between them. Any suitable number of gaps may be provided depending on the voltage rating of the device. The electrodes 20 are formed and each has an annular ridge 24 formed on its surface. The electrodes 20 are placed together with their ridges 24 extending oppositely toward the electrodes 22. The electrodes 20 and 22 are spaced apart to form a gap 13 between them. The peripheral edges of the electrodes 20 are flat surfaces and these flat surfaces lie in engagement with each other. The ridges 24 of electrodes 20 extend continuously around the electrodes and toward the intervening electrodes 22. The electrodes may be made of any suitable conducting material, but are preferably made of brass. The edges of the electrodes 22 and the flat peripheral edges of the electrodes 20 are received in tight-fitting engagement in the slots 18 of the shells 16. The shells are placed with their longitudinal edges in opposing relationship and completely enclose the gap structure.

The spark-gap structure 12 is disposed in a column connected in series with the column of valve blocks 14. The valve blocks 14 are connected in series with each other. The gap structure 12 may be placed either on the top, middle, or at the bottom of the column of valve blocks but is shown in the drawings as being on top. At each end of the column of spark gaps and resistors is a top terminal stud 26 and a bottom terminal stud 28. The studs 26 and 28 have integral disc portions 30 and 32, respectively, which engage the upper electrode 22 of the gaps and the lower surface of the blocks 14 at the bottom and make good electrical contact therewith.

As shown in FIG. 1, resistance blocks 14 have their adjacent end surfaces in engagement with each other to provide good electrical contact resulting in a series connected column of blocks. Any suitable means may be utilized for providing good electrical contact between the blocks, as for example, a metal coating on the ends of the blocks.

As can best be seen in FIG. 3, the upper terminal is connected to the line or to a device to be protected. All the elements of the arrester are connected in series and the lowermost element here shown as a resistor block is connected to ground.

The entire assembly, studs 26 and 28, discs 30 and 32, shells 16, gap structure 12, and non-linear resistance blocks 14, is encased in a thermosetting plastic housing 34 with only the end portions of the terminals 26 and 28 projecting outwardly from the ends of the housing 34. The housing 34 is injection molded about the arrester assembly so as to make it air tight, moisture proof and leak proof.

If desired, an outer housing 36, which may be of cylindrical shape with an open bottom, can be utilized to cover the housing 34. The housing 36 may have a central opening at its upper end to receive a reduced cylindrical portion 38 of the housing 34 which surrounds the stud 26. A resilient washer 39 is received on the terminal 26, and a nut 40 is threaded thereover to secure the housing 36 to the assembly. It will be understood, of course, that the housing 34 is sufficient to protect the arrester from damage and leakage and render it moisture and weather proof, and that the housing 36 may be omitted, if desired.

An annular ring 42 is received about the outer circumference of the porcelain housing 36. The outer ring 42 has a holder (not shown) for mounting the arrester. While mounting means 42 is shown and described, it will, of course, be understood that any suitable means may be provided for mounting the arrester.

It will now be seen that by providing separately molded half shells, the slots 18 can be made to very close tolerances so as to support the electrodes 20 and 22 in their proper positions in a simple and economical manner. It will also be seen that the shells 16 prevent leakage of the thermoplastic material from entering the gap spaces during the injection molding operation.

Thus, an improved economical arrester is provided having properly spaced gaps in which the housing is not subject to breakage during shipment and manufacture. The housing is moisture proof and resists any tendency to shatter, such as would be inherent in a porcelain housing. The new unique spark-gap structure makes it possible to use a plastic molded outer housing which was not practicable before because of the difficulty and cost of maintaining close tolerances in the spacing of the gaps and the difficulty in preventing leakage of the thermosetting plastic in the spark-gap spaces.

A specific embodiment of the invention has been shown and described for the purposes of illustration, but it will be apparent that various other modifications and embodiments are possible and are within the scope of the invention.

I claim as my invention:

1. A spark gap device comprising a stack of spark gaps connected in series relation, each of said gaps comprising a pair of electrodes spaced apart to form a spark gap between them, an inner gap housing comprising a pair of pre-molded semicylindrical shells having means on their inner surface for supporting and spacing said electrodes, said housing completely enclosing the space between the electrodes, each shell having shaped longitudinal edges for interlocking engagement with the other shell of said pair, said shells positioned with their opposing longitudinal edges in engagement about said electrodes and a molded plastic outer housing completely enclosing and sealing said gaps and said shells.

2. A spark gap device comprising a stack of spark gaps connected in series relation, each of said gaps comprising a pair of electrodes having flat peripheral edges, an inner gap housing comprising a pair of pre-molded semicylindrical shells having a plurality of annular grooves therein to receive and space said electrodes, said housing completely enclosing the space between the electrodes, each shell having shaped longitudinal edges for interlocking engagement with the other shell of said pair, said flat peripheral edges received in said annular grooves, said shells positioned with their opposing longitudinal edges in engagement about said gap electrodes and a molded plastic outer housing completely enclosing and sealing said gaps and said shells.

3. A lightning arrester comprising a stack of spark gaps connected in series relation, each of said gaps comprising a pair of electrodes having flat peripheral edges, a stack of non-linear resistors connected in series with each other and with said gaps, an inner gap housing comprising a pair of pre-molded semicylindrical shells having a plurality of annular grooves therein to receive and space said gap electrodes, said housing completely enclosing the space between the electrodes, each shell having shaped longitudinal edges for interlocking engagement with the other shell of said pair, said flat peripheral edges received in said annular grooves, said shells positioned with their opposing longitudinal edges in engagement about said gap electrodes and a molded plastic outer housing completely enclosing and sealing said gaps, said shells and said resistors.

References Cited in the file of this patent

UNITED STATES PATENTS

| | | |
|---|---|---|
| 928,049 | Hewlett | July 17, 1909 |
| 1,561,249 | Kraut | Nov. 10, 1925 |
| 1,578,578 | Breisch | Mar. 30, 1926 |
| 2,163,697 | Mittelstodt | June 27, 1939 |
| 2,179,297 | Johnson | Nov. 7, 1939 |
| 2,300,931 | Kalischer | Nov. 3, 1942 |
| 2,721,958 | Pidoux | Oct. 25, 1955 |
| 2,783,410 | Manke | Feb. 26, 1957 |